April 5, 1949.　　　　J. ZIEMIANIN, SR　　　　2,466,347
STRAINER
Filed July 1, 1947
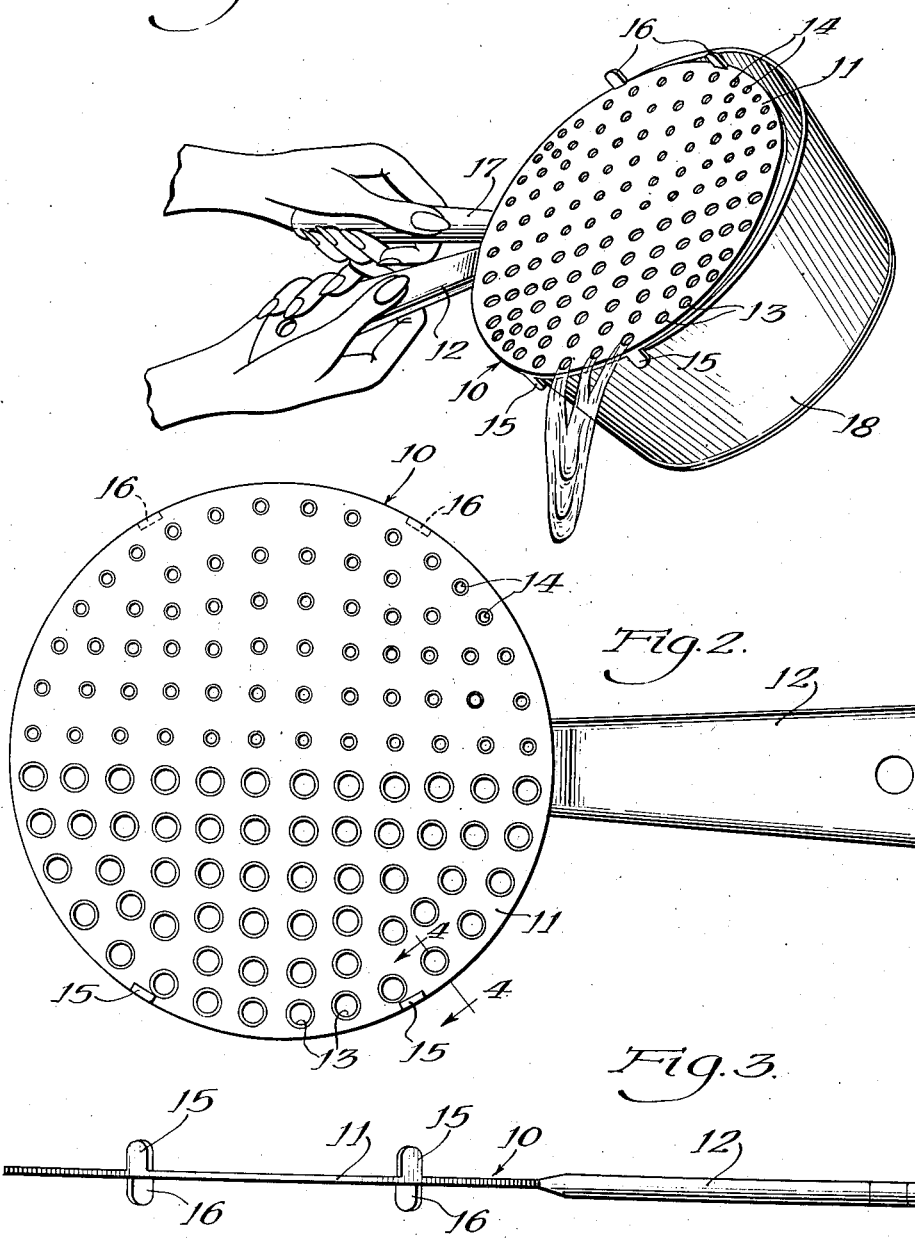
Inventor:
John Ziemianin, Sr.
By Wallace and Cannon
Attorneys Patented Apr. 5, 1949

2,466,347

UNITED STATES PATENT OFFICE 2,466,347

STRAINER

John Ziemianin, Sr., Chicago, Ill.; Valerie Ziemianin administratrix of said John Ziemianin, Sr., deceased Application July 1, 1947, Serial No. 758,304

2 Claims. (Cl. 210—163.5)

This invention relates to strainers and, more particularly, to strainers for use in draining water or like fluids from cooking utensils, such as pots and pans, in which various foods, such as potatoes, noodles, and the like, have been cooked.

It is common practice for housewives to drain the water from potatoes, noodles, or other foods, by arranging a cover or lid over the pot or pan in which the food is arranged and then tilting the pot or pan with one hand while holding the lid or cover thereon with the other hand, during the pouring or draining operation. This practice is subject to a number of objections, the principal one of which is the danger of the housewife having her hands scalded by the hot water and steam escaping from the pot or pan during the draining and pouring operation.

An object of the present invention is to provide a new and improved and relatively simple strainer which may be manufactured economically in one piece of suitable metal, such as an aluminum alloy, by means of a single die casting operation, and which may be readily used for draining hot water from cooking pots and pans of various sizes and in such manner and so as to eliminate the danger of the user having her hands scalded by such hot water.

Another object of the present invention is to construct the new strainer in such a manner that it may be readily used for straining hot water from pots and pans containing various kinds of foods, such, for example, as potatoes, turnips, noodles, and the like.

A further object of the invention is to construct the new strainer in such a manner that it may readily be held by one hand in position for use upon the top of a cooking vessel such, for example, as a pot or pan, during the straining operation, while leaving the user's other hand free for holding the pot or pan on which the strainer is arranged.

Other and further objects of the present invention will be apparent from the following description and claims and are illustrated in the accompanying drawings which, by way of illustration, show preferred embodiments and the principles thereof and what I now consider to be the best mode in which I have contemplated applying these principles. Other embodiments of the invention embodying the same or equivalent principles may be used and structural changes may be made as desired by those skilled in the art without departing from the present invention and the purview of the appended claims.

Fig. 1 is a perspective view illustrating a preferred embodiment of the new strainer arranged in position for use upon a cooking utensil and illustrating the manner in which the strainer is held thereon during the straining operation;

Fig. 2 is a top plan view of a preferred form of the new strainer shown in Fig. 1;

Fig. 3 is a side or edge elevational view of the strainer shown in Figs. 1 and 2; and Fig. 4 is an enlarged sectional detail view on line 4—4 in Fig. 2.

A typical and preferred embodiment of the new strainer is illustrated in the drawing, wherein it is generally indicated at 10, and comprises a one-piece substantially disc-shaped metal body 11 and integrally attached handle 12 which may be made of any suitable metal such, for example, as an aluminum alloy, and in a single die casting operation.

As shown in the drawing, a generally semi-circular area consisting of substantially one-half of the area of the disc-shaped metal body 11 (the lower half as seen in Fig. 2) is provided with a multiplicity of more or less equidistantly spaced and countersunk circular drain openings or holes 13. The other semi-circular area of the disc-shaped metal body 11 is provided with a multiplicity of countersunk drain openings or holes 14 which are somewhat smaller in diameter than the drain openings or holes 13. As is also shown in the drawing the relatively smaller drain openings or holes 14 are spaced somewhat farther apart than the relatively larger drain openings or holes 13.

As shown in the drawing, the disc-shaped metal body 11 of the new strainer 10 has a pair of spaced lugs 15 formed integral therewith in spaced relationship along the marginal or peripheral edge of the disc-shaped metal body 11 on opposite sides of a diameter extended through the disc-shaped body 11 at right angles to the plane or longitudinal axis of the handle 12. These lugs 15 extend at substantially right angles to the plane of the disc-shaped metal body 11 and above the upper surface of the latter, as the strainer 10 is seen in Figs. 2 and 3.

The new strainer 10 also includes a second pair of lugs 16, which are similar to the lugs 15, and are formed integral with the disc-shaped body 11 on the marginal or peripheral edge thereof and in spaced relationship with each other on opposite sides of a diameter extended through the disc-shaped body 11 at substantially right-angles to the plane or longitudinal axis of the handle 12.

As may be seen by reference to the drawing, the lugs 16 extend at substantially a right angle to the plane of the disc-shaped body 11 but are disposed on the side of the disc-shaped body 11 which is opposite to the side on which the lugs 15 are arranged.

In the use of the new strainer the handle 12 thereof may be grasped in one hand (normally, the right hand) of the user while having the other hand of the user free to grasp the handle 17 of a cooking utensil, such as the pot 18, containing potatoes, turnips, noodles, or other food products, from which it is desired to drain hot water. Thus, the strainer 10 and the cooking utensil or pot 17—18 will be held in the relative positions in which they are shown in Fig. 1, whereupon hot water may be drained from the pot 17—18 through the relatively large countersunk drain openings or holes 13, as shown in Fig. 1.

By reference to Fig. 1 it will be noted that during the draining operation the strainer 10 is held in position over the top of the cooking utensil or pot 18 by manual pressure applied by the user (through the handle 12 and body 11 of the strainer 10) upon the depending lugs 15 so as to urge the latter against the side wall of the cooking utensil or pot 18. This action keeps the body 11 of the strainer 10 over the top of the pot 18 and causes the hot water to be drained off through the relatively large countersunk holes 13, as shown in Fig. 1.

The relatively large holes 13 are particularly adapted for use when draining hot water from potatoes, turnips, and like vegetables or other food products in the cooking utensil or pot 18. However, in certain instances as, for example, when draining hot water from noodles or like food products in a cooking utensil or pot 18, it is desirable to use the relatively smaller drain holes or openings 14 since noodles or like food products may tend to pass through the relatively large diameter drain openings or holes 13 which are used in draining hot water from potatoes, turnips, or other vegetables, or food products.

Accordingly, when it is desired to utilize the relatively smaller drain openings or holes 14, the strainer 10 is turned through 180° from the position in which it is shown in Fig. 1, so that the lugs 16 will then be disposed in the position in which the lugs 15 are shown in Fig. 1, and, similarly, the lugs 15 will then be disposed in the position in which the lugs 16 are shown in Fig. 1. This turning operation will thus position the relatively smaller drain openings or holes 14 in the position in which the relatively large holes 13 are shown in Fig. 1, and, similarly, the relatively large drain openings or holes 13 will then be disposed in the position in which the smaller drain openings or holes 14 are shown in Fig. 1. The straining operation may then be completed by holding the cooking utensil or pot 17—18 and the strainer 10 in the relative positions described above in reference to Fig. 1, but with the strainer having been moved through 180°. Manual pressure is then exerted, through the handle 12 and body 11 of the strainer, to urge the lugs 16 into engagement with the side wall of the pot 17—18, whereupon the hot water may be strained from the cooking utensil or pot 17—18 through the relatively smaller drain holes or openings 14 so as to drain the hot water from noodles or other food products which might tend to pass through the larger drain openings in holes 13 if the latter were used for draining hot water therefrom.

It will thus be seen from the foregoing description, considered in conjunction with the accompanying drawing, that the present invention provides a new and improved and relatively simple and inexpensive strainer having the desirable advantages and characteristics, and accomplishing its intended objects, including those hereinbefore set forth and others which are inherent in the invention.

I claim:

1. A strainer comprising a substantially flat and substantially disc-shaped body provided with a handle which extends laterally from the peripheral edge of the said substantially flat and disc-shaped body, the said substantially flat and disc-shaped body including a substantially semi-circular area having a group of spaced and relatively larger drain holes formed therein, and the said substantially flat and disc-shaped body including a second and substantially semi-circular area having a second group of spaced drain holes therein of somewhat smaller diameter than the said first-named group of relatively larger drain holes, the said substantially flat and disc-shaped body having a lug formed integral therewith on its peripheral edge and extending upwardly above the upper surface of the said substantially flat and disc-shaped body in a direction approximately at right angles to the plane thereof, and the said substantially flat and disc-shaped body having a second lug formed integral therewith on its peripheral edge and spaced approximately 180° thereon from the said first-named lug and extending downwardly below the bottom surface of the said substantially flat and disc-shaped body in a direction at approximately right angles to the plane thereof, whereby the said strainer may be selectively disposed over the top of a cooking utensil and manually tilted with the said cooking utensil into an inclined pouring position with either the said group of relatively larger drain holes or the said group of relatively smaller drain holes disposed in the then lower and inclined pouring position relative to the plane of the said substantially flat and disc-shaped body and with the then lower one of the said lugs pressed against and extending downwardly along the side wall of the said cooking utensil.

2. A strainer as defined in claim 1 in which the said substantially flat and disc-shaped body includes a second lug formed integral therewith on its peripheral edge and on the upper surface thereof and in spaced relationship to the said first-named lug formed on the upper surface thereof, and in which the said substantially flat and disc-shaped body includes a second lug formed integral therewith on its peripheral edge and on the bottom surface thereof and in spaced relationship to the said first-named lug formed on the bottom surface of the said substantially flat and disc-shaped body.

JOHN ZIEMIANIN, Sr.

REFERENCES CITED

The following references are of record in the file of this patent:

UNITED STATES PATENTS

| Number | Name | Date |
| --- | --- | --- |
| 249,494 | Alden | Nov. 15, 1881 |
| 639,208 | Buckley | Dec. 19, 1899 |
| 852,472 | Tracey | May 7, 1907 |
| 1,130,756 | Nash | Mar. 9, 1915 |
| 1,183,468 | Knight | May 16, 1916 |
| 1,624,745 | Kuhnast | Apr. 12, 1927 |